UNITED STATES PATENT OFFICE.

ADOLF ANKLI, OF PHOENIX, ARIZONA.

VEGETABLE GLUE AND METHOD OF MAKING THE SAME.

1,363,830.  Specification of Letters Patent.  Patented Dec. 28, 1920.

No Drawing.  Application filed October 16, 1919. Serial No. 331,250.

*To all whom it may concern:*

Be it known that I, ADOLF ANKLI, a citizen of Switzerland, residing at Phoenix, in the county of Maricopa and State of Arizona, have invented new and useful Improvements in Vegetable Glue and Methods of Making the Same, of which the following is a specification.

My invention relates to a vegetable glue derived from the cactus family of plants (*Cactaceæ*).

It is an object of this invention to make a vegetable glue which is inexpensively prepared, has excellent adhesive properties and will keep indefinitely.

Another object of this invention is to prepare a glue which is ready for application at all times without danger of it becoming decomposed and which has no objectionable odor.

My invention consists in the steps of the process for producing a vegetable glue and the resulting product, hereinafter described and claimed.

In the southwestern part of the United States and in Mexico members of the cactus family are abundant and form a waste product. I utilize the same in preparing my vegetable glue. The fleshy parts of the cactus plants are chopped into small pieces and placed with a quantity of water into a kettle and brought to a boil. The juice of the parts of the cactus plant is colorless, but gradually assumes a light brown color, due, undoubtedly, to chemical changes, probably oxidation, although I am not prepared to describe the exact nature of them. The boiling operation is continued for ten to twelve hours and the mass is then strained through a strainer or cloth filter in order to separate the pulp from the juice. The juice is boiled down until it has the consistency and appearance of molasses. The concentrated juice thus prepared has a faint and not disagreeable odor and is now ready for the containers.

My vegetable glue is applied like any ordinary glue to the articles to be glued together. It dries overnight and is as strong, if not stronger, in its adhesive qualities than animal glue. It will keep indefinitely and needs no thinning with water or heating before using the same.

In place of boiling the fleshy parts of the cactus plants in water and afterward separating the pulp from the juice, the fleshy parts of the plants may be crushed and pressed, and the pressed juice concentrated to the desired consistency, it being essential that the juice has access to the air in order to effect the chemical changes. When the concentrated juice begins to foam and boil over it indicates that the proper consistency has been reached.

The vegetable liquid glue thus prepared may be used unmixed with any other glue, or it may be used in combination with any of the glues in commerce.

I claim:

1. A vegetable glue made of the juice of cactus plants (*Cactaceæ*) by boiling the same, with access to the air, until it assumes a dark brown color and has the consistency of molasses.

2. A method of making liquid vegetable glue from cactus plants (*Cactaceæ*) comprising boiling the juice of the cactus, with access to the air, until it has assumed a dark brown color and has the consistency of molasses.

3. As an article of manufacture, a glue, the base of which is concentrated and oxidized juice of the cactus.

In testimony whereof I have signed my name to this specification.

ADOLF ANKLI.